(12) United States Patent
Padiyar et al.

(10) Patent No.: US 11,140,224 B2
(45) Date of Patent: Oct. 5, 2021

(54) MOVING STORAGE VOLUMES ACROSS NETWORK BOUNDARIES

(71) Applicant: Microsoft Technology Licensing, LLC, Redmond, WA (US)

(72) Inventors: Vinayak Uppunda Padiyar, Bellevue, WA (US); Ramakanth Kakani, Mill Creek, WA (US); Mehrdad Moradi, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/812,262

(22) Filed: Mar. 6, 2020

(65) Prior Publication Data

US 2021/0281642 A1    Sep. 9, 2021

(51) Int. Cl.
| | |
|---|---|
| *G06F 3/06* | (2006.01) |
| *H04L 29/08* | (2006.01) |
| *G06F 12/02* | (2006.01) |
| *G06F 9/455* | (2018.01) |

(52) U.S. Cl.
CPC ...... *H04L 67/1095* (2013.01); *G06F 9/45558* (2013.01); *G06F 12/0253* (2013.01); *H04L 67/1097* (2013.01); *G06F 2009/45583* (2013.01); *G06F 2009/45595* (2013.01); *G06F 2212/1044* (2013.01)

(58) Field of Classification Search
CPC ............. H04L 67/1095; H04L 67/1097; G06F 9/45558; G06F 12/0253; G06F 2009/45595; G06F 2009/45583; G06F 2212/1044

See application file for complete search history.

(56) References Cited

U.S. PATENT DOCUMENTS

| | | | |
|---|---|---|---|
| 10,129,162 | B1 | 11/2018 | Faulk, Jr. |
| 10,133,593 | B1 * | 11/2018 | Sethuramalingam ....................... G06F 9/45558 |
| 2017/0185325 | A1 * | 6/2017 | Pabon .................... G06F 11/20 |
| 2018/0336046 | A1 | 11/2018 | Miyauchi et al. |
| 2019/0179530 | A1 * | 6/2019 | Chen ...................... G06F 3/061 |
| 2019/0319847 | A1 | 10/2019 | Nahar et al. |

OTHER PUBLICATIONS

"International Search Report and Written Opinion Issued in PCT Application No. PCT/US21/014047", dated May 4, 2021, 11 Pages.

* cited by examiner

*Primary Examiner* — Kim T Nguyen
(74) *Attorney, Agent, or Firm* — Ray Quinney & Nebeker; James Bullough

(57) ABSTRACT

The present disclosure relates to systems, methods, and computer readable media for moving storage volumes between virtual networks. For example, systems disclosed herein may manage mapping data including mappings between virtual networks and storage volumes. In particular, the systems disclosed herein may maintain mappings between virtual network identifiers (e.g., IP addresses) and globally unique identifiers (GUIDs) associated with respective storage volumes. A control plane may move storage volumes between virtual boundaries by modifying mapping entries based on a received request to move storage volume (s). By maintaining and modifying mapping data in this way, systems disclosed herein facilitate access to a storage device between different virtual networks without performing a computationally expensive and time-consuming process of physically moving data between storage volumes on a cloud computing system.

20 Claims, 11 Drawing Sheets

MOVING STORAGE VOLUMES ACROSS NETWORK BOUNDARIES

BACKGROUND

A cloud computing system refers to a collection of computing devices on which data can be remotely stored and accessed. For example, modern cloud computing infrastructures often include a collection of physical server devices organized in a hierarchical structure including computing zones, clusters, virtual local area networks (VLANs), racks, fault domains, etc. Cloud computing systems often make use of different types of virtual services (e.g., computing containers, virtual machines) that provide remote storage and computing functionality to various clients or customers. These virtual services can be hosted by respective server nodes on a cloud computing system.

Current cloud computing systems generally include tight couplings between virtual networks (e.g., cloud-based virtual networks) and network-enabled storage volumes. This logical division of resources enables a cloud computing system to maintain policies for specific customers and/or organizations of users to protect data and prevent unauthorized individuals from accessing certain data files. In this way, an organization may maintain virtual boundaries that selectively enable certain individuals from accessing a storage volume while preventing other individuals from accessing the same storage volume.

While conventional virtual network systems provide useful tools to enhance security and organize access to storage volumes, moving storage volumes and/or reorganizing access to the storage volumes has become increasingly difficult. For example, tight couplings between logical boundaries and storage volumes often prevent customers from moving storage volumes across logical boundaries, even within the same virtual network. Indeed, reorganizing virtual boundaries and access to storage volumes generally involves making one or more copies of storage volumes for any number of virtual networks. Where storage volumes often include massive quantities of data, reorganizing virtual boundaries in this way is computationally expensive and often takes a significant amount of time in which storage volumes are down or have otherwise limited accessibility.

These and other problems exist with regard to moving storage volumes between virtual boundaries on a cloud computing system.

DETAILED DESCRIPTION

Figure 1:
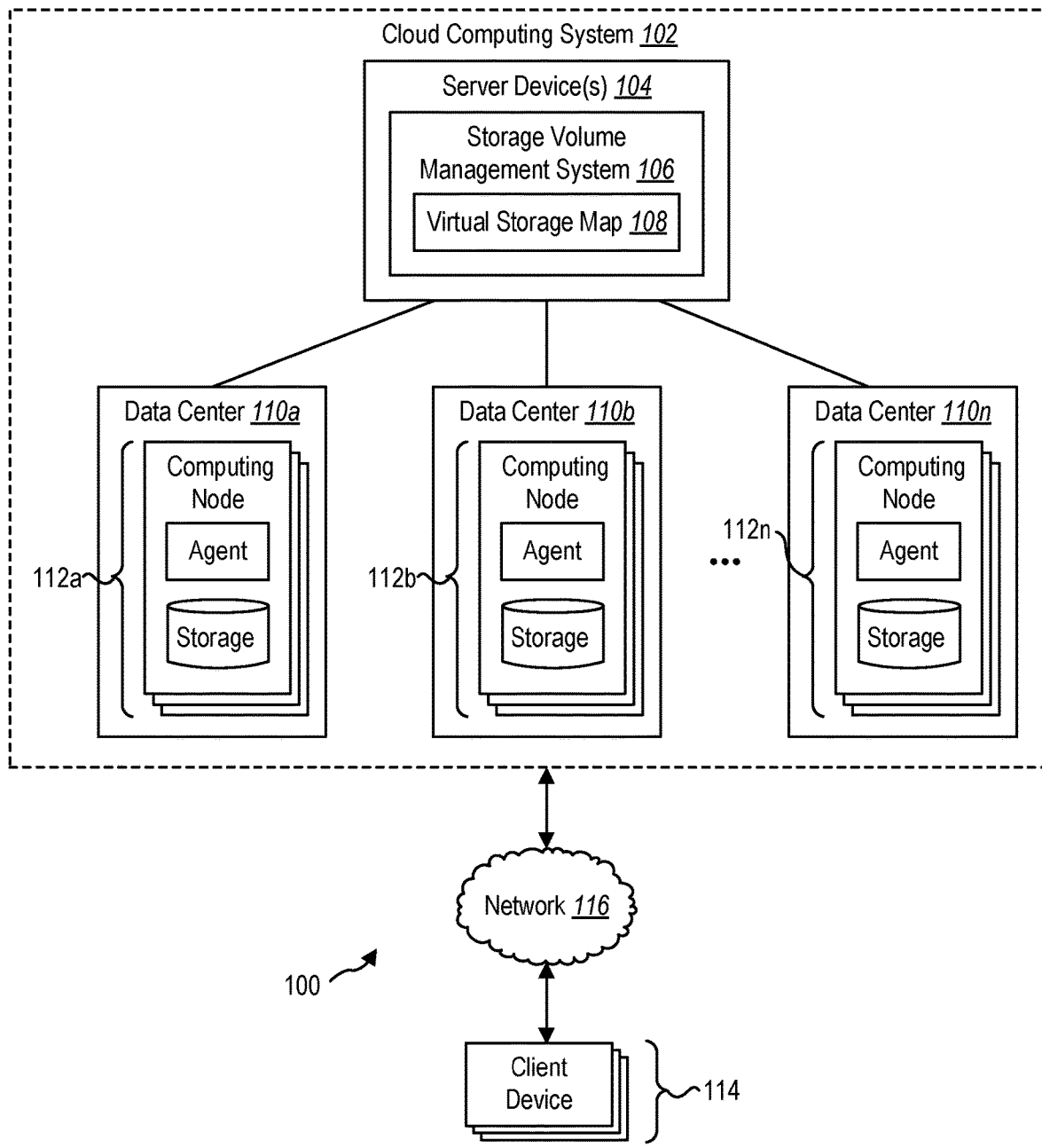
FIG. 1 illustrates an example environment of a cloud computing system including a storage volume management system in accordance with one or more implementations.

The present disclosure is generally related to a storage volume management system for enabling movement of storage volumes between virtual boundaries on a cloud computing system in a convenient and flexible way. For example, a control plane may maintain a storage appliance (e.g., a virtual storage map) including mapping data between virtual networks and corresponding storage volumes. As will be discussed in further detail below, the storage volume management system can maintain mapping data including any number of mappings between virtual network identifiers (e.g., VNET identifiers, subnet identifiers, IP addresses) and storage volume identifiers (e.g., globally unique identifiers). The storage volume management system may be implemented within a hierarchy of the cloud computing system (e.g., within a region of data centers) to facilitate movement of storage volumes between virtual boundaries of the cloud computing system.

For example, the storage volume management system (e.g., a control plane including the storage volume management system implemented thereon) may maintain mapping data for datacenters (e.g., a region of datacenters) including any number of mapping entries. The mapping entries may include mappings between virtual network identifiers (e.g., IP addresses, subnet identifiers, VNET identifiers, domain names) and storage volume identifiers (e.g., globally unique identifiers) that point to storage volumes on the datacenter(s). The storage volume management system may receive a request to move a storage volume from a first virtual network to a second virtual network. As will be discussed further, the storage volume management system can implement movement of the storage volume based on modifying one or more mapping entries of the mapping data to include mappings between a storage volume identifier and the second virtual network. The storage volume management system can use this mapping to facilitate providing access to the storage volume to services and systems of the second virtual network.

As will be discussed in further detail below, the present disclosure includes a number of practical applications having features described herein that provide benefits and/or solve problems associated with moving storage volumes between logical boundaries of a cloud computing system. Some example benefits are discussed herein in connection with various features and functionality provided by the storage volume management system. Nevertheless, it will be appreciated that benefits explicitly discussed in connection with one or more implementations are provided by way of example and are not intended to be a comprehensive list of all possible benefits of the storage volume management system.

As a first example, by implementing a control plane that maintains a collection of mapping data including mappings between virtual network identifiers and storage volume identifiers, the storage volume management system significantly enhances mobility of storage volumes across virtual networks on the cloud computing system. In particular, upon receiving a request including an identification of a virtual network identifier, the storage volume management system can "move" a storage volume between network boundaries by adding or otherwise modifying mapping data for the storage volume to enable a host associated with the virtual network to access the storage volume.

In addition, maintaining mapping data and updating mapping entries in accordance with one or more embodiments enables movement of storage volumes without copying large volumes of data across virtual boundaries. Rather, the storage volume management system enables modification of virtual boundaries without compromising security of storage volumes. Indeed, in accordance with one or more embodiments described herein, the storage volume management system can provide any number of virtual networks access to a storage volume while enforcing security policies unique to each of the virtual networks and without maintaining a respective copy of the storage volume on host systems associated with each of the virtual networks.

Features and functionality of the storage volume management system may further enhance access to storage volumes under failure or recovery conditions. For example, where a storage volume goes down and a redundant storage volume on a different computing rack or data center may have a current version of the data from the storage volume stored thereon, the storage volume management system can facilitate updating mapping information to associate virtual machine identifiers (e.g., virtual network identifiers for the respective virtual machines) with a globally unique identifier for the redundant storage volume. In this way, rather than spinning up new virtual machines on a different virtual network or implementing new code on potentially thousands of virtual machines, the virtual machines may obtain access to the redundant storage volume based on updated mapping data rather than waiting until the storage volume has recovered from going down.

As illustrated in the foregoing discussion, the present disclosure utilizes a variety of terms to describe features and advantages of the systems described herein. Additional detail is now provided regarding the meaning of some of these terms. For example, as used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc.

As used herein, a "virtual network" refers to a domain or grouping of nodes and/or services of a cloud computing system. Examples of virtual networks may include cloud-based virtual networks (e.g., VNETs), subcomponents of a VNET (e.g., IP addresses or ranges of IP addresses), or other domain defining element that may be used to establish a logical boundary between devices and/or data objects on respective devices. In one or more embodiments described herein, a virtual network may include host systems including nodes from the same rack of server devices, different racks of server devices, and/or different datacenters of server devices. Indeed, a virtual network may include any number of nodes and services associated with a control plane having a collection or database of mapping data maintained thereon. In one or more embodiments described herein, a virtual network may include nodes and services exclusive to a specific region of datacenters.

As used herein, "mapping data" or "a collection of mapping data" refers to any data or information associating storage volumes and virtual networks on a cloud computing system. In one or more implementations, mapping data refers to a storage appliance, such as a table, data file, or other data object including information associating virtual network identifiers (e.g., VNET identifiers, subnet identifiers, IP addresses) and volume identifiers (e.g., globally unique identifiers). In one or more implementations described herein, mapping data may include a plurality of mapping entries having mappings between virtual networks and storage volumes. For example, each mapping entry may include one or more mappings or associations between a given virtual network(s) and a storage volume(s). In addition, and as will be discussed in further detail below, the mapping data may be stored or otherwise maintained on a control plane that manages virtual machines and other services across a set of datacenters (e.g., a region of datacenters) of the cloud computing system.

Additional detail will now be provided regarding a storage volume management system in relation to illustrative figures portraying example implementations. For example, FIG. 1 illustrates an example environment 100 including a cloud computing system 102. The cloud computing system 102 may include any number of devices. For example, as shown in FIG. 1, the cloud computing system 102 includes one or more server device(s) 104 having a storage volume management system 106 implemented thereon. As will be discussed in further detail below, the storage volume management system 106 may include a virtual storage map 108 including mappings between storage volumes and virtual networks. In one or more embodiments, the storage volume management system 106 is implemented as a control plane (e.g., a software-defined networking (SDN) control plane) configured to track host systems within a VNET and control operation of a data plane. In one or more implementations, the storage volume management system 106 is configured or otherwise designed to run on logically centralized control plane(s). These control planes may be equipped with both storage and network management application programming interface (API) and/or functionalities that facilitate many of the features and functionalities of the volume management system 106 described herein. For instance, the control plan(s) may be equipped with a network management southbound API (e.g., an API configured to communicate between a control plane (e.g., SDN control plane) and switches, routers, or other devices of a datacenter) that facilitates features and functionalities described herein.

As further shown, the cloud computing system 102 includes a number of data centers 110a-n. Each of the data centers 110a-n can include any number of computing nodes 112a-n. For example, a first data center 110a may include computing nodes 112a having an agent and storage thereon. Similarly, the second data center 110b may include computing nodes 112b having similar components thereon. Each of the data centers 110a-n may include any number of computing nodes having agents and available storage and/or processing capacity. In one or more embodiments, the data centers 110a-n refer to data centers of a specific region of the cloud computing system 102. In one or more implementations described herein, the data centers 110a-n refer to a region of data centers associated with a corresponding storage volume management system 106 including a virtual storage map 108 having mapping data limited to the region of data centers. Other regions of the cloud computing system 102 may include an additional storage volume management system having an additional virtual storage map unique to the corresponding region(s) of data centers.

In one or more embodiments, and as will be discussed in further detail below, each of the data centers 110a-n may include any number of server racks including host systems having one or more computing nodes. For example, the first data center 110a may include thousands of server racks (e.g., 100,000s of racks). Each server rack may include a switch (e.g., top of the rack switch) and a number of host systems (e.g., 40 host systems) thereon. Each of the host systems may additionally include any number of computing nodes having a variety of applications and services implemented thereon.

In addition, virtual networks hosted by the cloud computing system 102 may be defined to include any number of hosts and respective nodes of the data centers 110a-n. Indeed, a virtual network may include one or multiple host systems on the same rack, across different racks of the same data center, and across different racks of different data centers. Storage volumes on each of the host systems and/or computing nodes may be associated with a corresponding globally unique identifier (e.g., GUID). Moreover, devices of the data centers 110a-n may have associated IP addresses. As will be discussed in further detail below, one or more virtual networks may be defined based on IP addresses or other domain identifiers (e.g., single IP addresses, subnets including ranges of IP identifiers, VNETs including multiple subnets).

As mentioned above, and as will be described in further detail below in connection with various examples, the virtual boundaries defined by the virtual networks is tracked and managed by the storage volume management system 106 within the virtual storage map 108. For example, the virtual storage map 108 may include a record of IP addresses associated with each of the host systems and corresponding computing nodes of the data centers 110a-n. Further, the virtual storage map 108 may include information about virtual network boundaries including an identification of any subnets, IP addresses, or other domain identifiers associated with corresponding virtual networks. In addition, the virtual storage map 108 may include mappings between GUIDs and virtual network identifiers (e.g., IP addresses, subnets, VNET identifiers).

As further shown in FIG. 1, the environment 100 includes client devices 114 in communication with the cloud computing system 102. The client devices 114 may refer to various types of client devices capable of accessing data on the cloud computing system 102. For instance, a client device may refer to a mobile device such as a mobile telephone, a smart phone, a personal digital assistant (PDA), a tablet, a laptop, or wearable computing device (e.g., a headset or smartwatch). A client device may also refer to a non-mobile device such as a desktop computer, a server node (e.g., from another cloud computing system), or other non-portable device. The client devices 114, server device(s) 104, and computing nodes 112a-n may include additional features and functionality as generally discussed below in connection with FIG. 8.

The network 116 may include one or multiple networks that use one or more communication platforms or technologies for transmitting data. For example, the network 116 may include the Internet or other data link that enables transport of electronic data between respective client devices 112 and components (e.g., server device(s) 104 and/or virtual machines thereon) of the cloud computing system 102.

Figure 2:
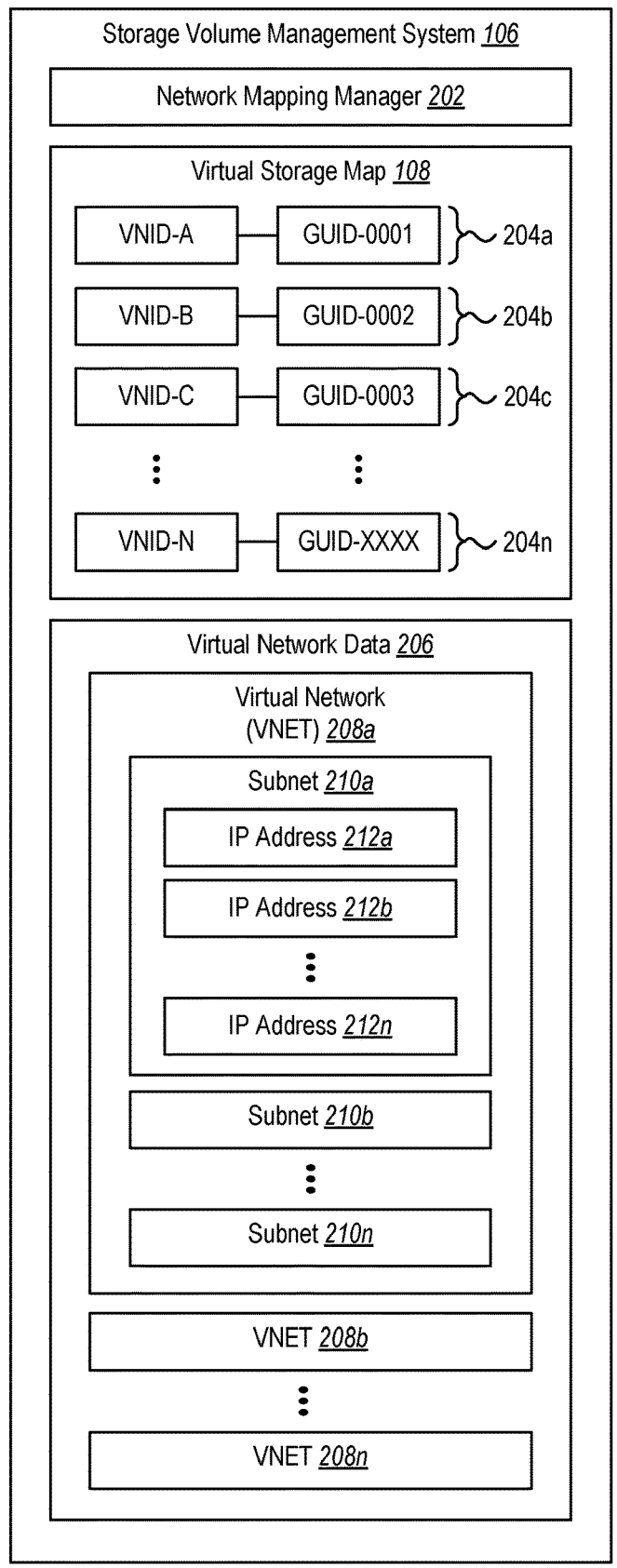
FIG. 2 illustrates an example implementation of the storage volume management system in accordance with one or more implementations.

Additional detail will now be discussed in connection with the storage volume management system 106 in accordance with one or more embodiments herein. For example, as shown in FIG. 2, the storage volume management system 106 can include a network mapping manager 202. The network mapping manager 202 may implement features and functionality of the SDN control plane. For example, the network mapping manager 202 may provide an interface between applications and resources of the cloud computing system 102.

In the context of the storage volume management system 106, the network mapping manager 202 may manage information of the virtual storage map 108 including virtual network data generally as well as associations between virtual network identifiers and GUIDs of various storage volumes. For example, the network mapping manager 202 can receive and maintain (e.g., store and update) mapping information indicating mappings between virtual networks and storage volumes. The network mapping manager 202 can further provide updated mapping information to agents, host systems, and/or rack switches that enable host systems on various virtual networks to communicate with one another and access relevant data on storage volumes for which access has been provided.

As shown in FIG. 2, the virtual storage map 108 may include mapping entries 204a-n. The mapping entries 204a-n may include mappings between virtual network identifiers and storage volumes. For example, a first mapping entry 204a includes a mapping between a first virtual network identifier (VNID-A) associated with a first virtual network and a first globally unique identifier (GUID-0001) associated with a first storage volume. A second mapping entry 204b includes a mapping between VNID-B associated with a second virtual network and GUID-0002 associated with a second storage volume. The virtual storage map 108 may include additional mapping entries 204c-n including mappings between VNID-C through VNID-N and storage volume identifiers GUID-0003 through GUID-XXXX, respectively.

As mentioned above, the virtual network identifiers included within the virtual storage map 108 may refer to a variety of identifiers of virtual networks or sub-components of virtual networks. For example, the virtual network identifiers may refer to a name of a virtual network including one or more host systems on the cloud computing system 102. In one or more embodiments, the virtual network identifiers refer to IP addresses (or ranges of IP addresses) corresponding to devices on the cloud computing system 102. Further, the globally unique identifiers (GUID) may identify specific host systems or storage volumes provided by a corresponding host system. In one or more implementations described herein, the GUID refers to a number (e.g., 16-bit number) that uniquely identifies a storage volume (or a host of a storage volume) on the cloud computing system 102. Nevertheless, the GUID may include any format including data capable of uniquely distinguishing a host system and/or storage volume from other systems and storage volumes on the cloud computing system 102.

It will be understood that the listing of mapping entries 204a-n is provided by way of example and not limitations. For example, in the example shown in FIG. 2, the listing of mapping entries 204a-n shows a one-to-one correlation between VNIDs associated with corresponding virtual networks (or specific IP addresses) and GUIDs associated with respective storage volumes. Nevertheless, the listing of mapping entries 204a-n may include mappings between a VNID and multiple GUIDs corresponding to multiple storage volumes. In this example, a host system within a virtual network associated with the VNID may have access to multiple storage volumes associated with the GUIDs. Alternatively, the listing of mapping entries 204a-n may include mappings between multiple VNIDs and a single GUID corresponding to a storage volume. In this example, host systems on different virtual networks associated with the multiple VNIDs may have access to the storage volume associated with the single GUID.

As mentioned above, the storage volume management system 106 can additionally store, update, or otherwise manage virtual network data 206. As shown in FIG. 2, virtual network data 206 may include a topology or hierarchy of information that defines virtual networks on the cloud computing system 102. For example, the virtual network data 206 may include any number of VNETs 208a-n. Each of the VNETs 208a-n may include any number of subnets and IP addresses that define virtual boundaries of the respective VNETs 208a-n. For example, a first VNET 208a may include subnets 210a-n having any number of IP addresses. As shown in FIG. 2, a first subnet 210a may include a corresponding set of IP addresses 212a-n. Each subnet may include hundreds of IP addresses (e.g., 256 IP addresses per subnet) corresponding to respective devices or hosts on the cloud computing system 102.

As mentioned above, the storage volume management system 106 can facilitate movement of storage volumes between virtual networks in a way that overcomes many of the deficiencies discussed above in connection with copying and moving data between storage devices. For example, the storage volume management system 106 can receive a request to move a storage volume between virtual networks. In particular, the storage volume management system 106 can receive a request including an identification of an IP address or other virtual network identifier corresponding to a virtual network having logical boundaries that define which devices (e.g., host systems) have access to the storage volume. The request may additionally include an indication to modify permissions associated with the storage volume in a variety of ways.

As used herein "moving" a storage volume between virtual networks may refer to modifying access to the storage volume in connection with one or more virtual networks (or sub-elements of virtual network(s)). For example, moving a storage volume between a first virtual network and a second virtual network may refer to modifying permissions associated with accessing the storage volume by one or both of the first and second virtual networks. As an illustrative example, moving a storage volume from a first virtual network to a second virtual network may involve removing access to the storage volume from host systems on the first virtual network while enabling access to the storage volume to host systems on the second virtual network. In addition, or as an alternative, moving a storage volume from a first virtual network to a second virtual network may involve modifying policies to expand or reduce access to data on a storage volume to host systems on one or both of the virtual networks.

Figure 3A:
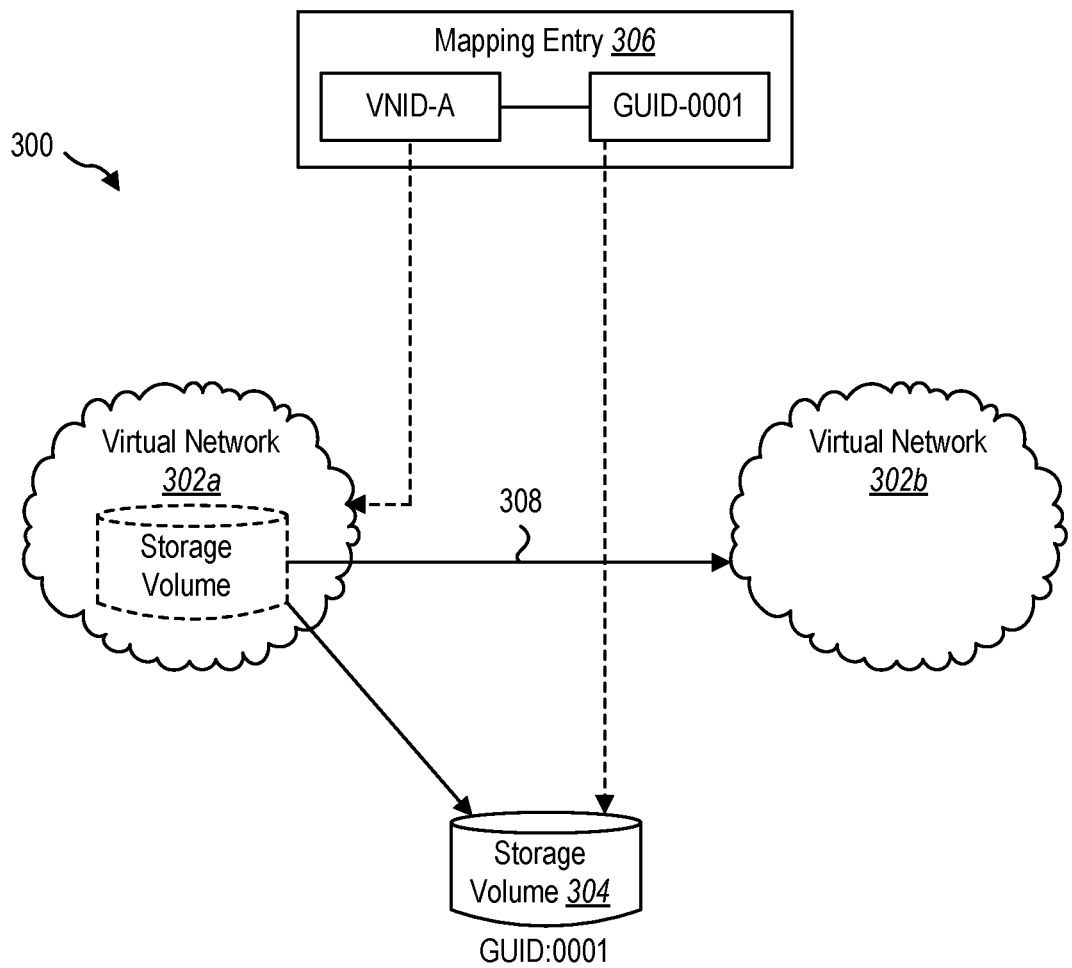
FIGS. 3A-3C illustrate an example implementation of modifying a storage volume map to facilitate moving a storage volume between virtual networks in accordance with one or more implementations.
Figure 3B:
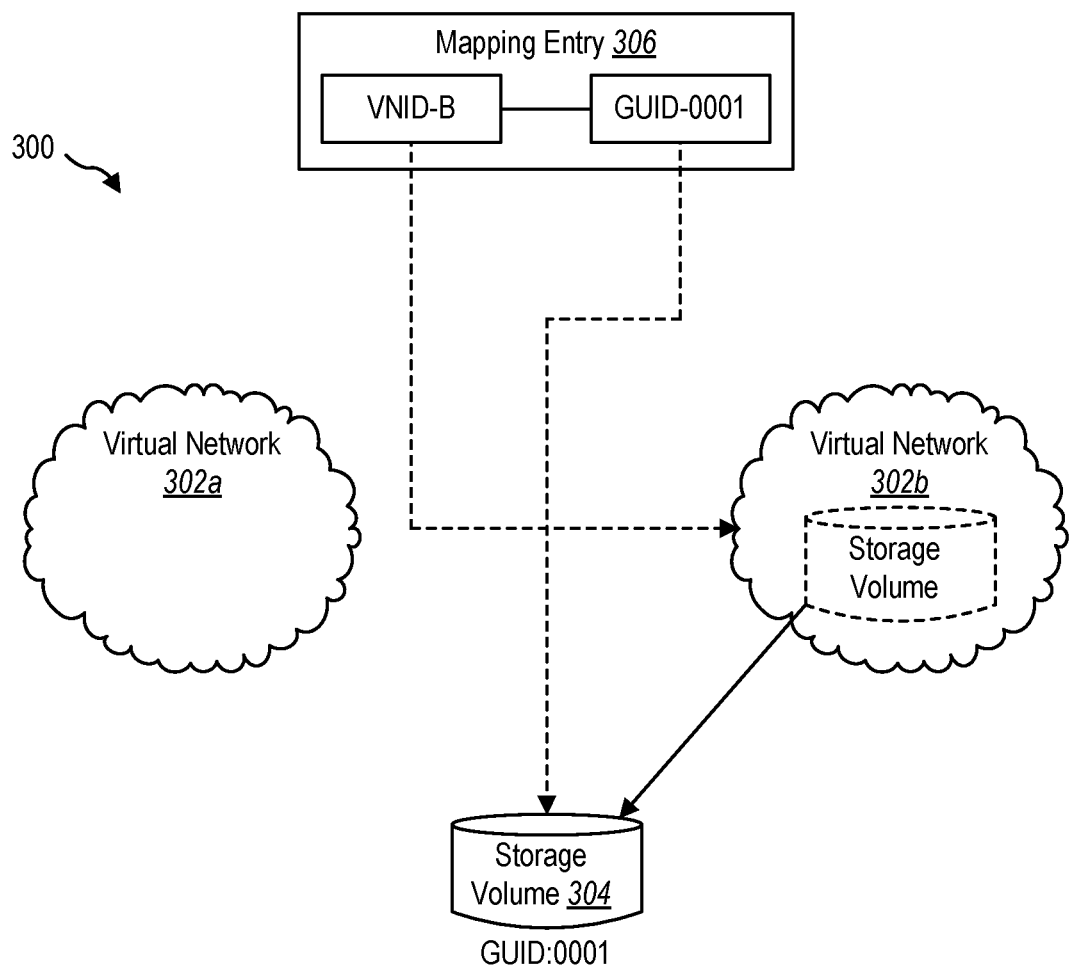
Figure 3C:
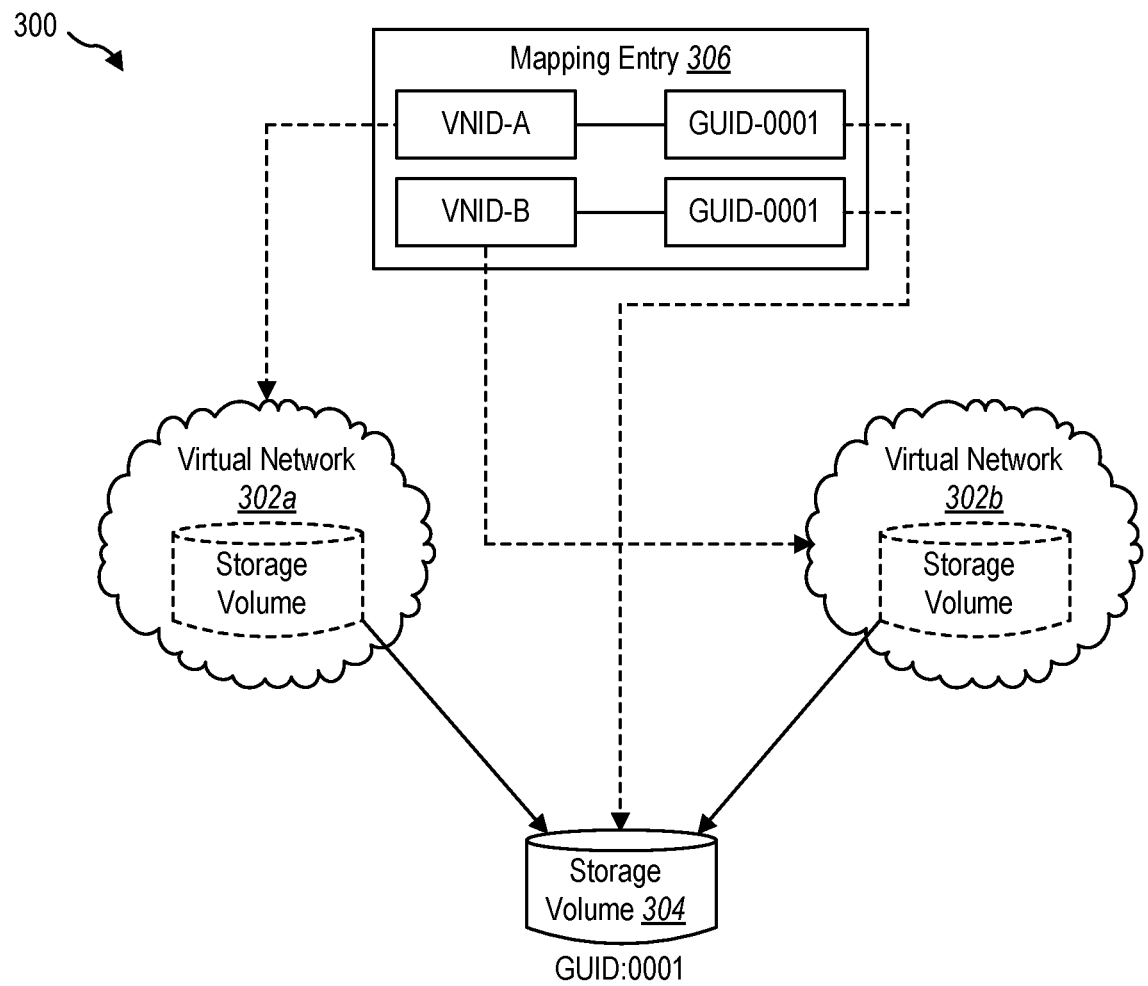

Additional information in connection with moving a storage volume is provided by way of example in FIGS. 3A-3C. For example, FIG. 3A illustrates an example environment 300 including a first virtual network 302a, a second virtual network 302b, and a storage volume 304. FIG. 3A additionally shows an example mapping entry 306 including a mapping between the first virtual network 302a and the storage volume 304. More specifically, the mapping entry 306 includes a mapping between a first virtual identifier (VNID-A) associated with the first virtual network 302a and a globally unique identifier (GUID-0001) associated with the storage volume 304. It will be appreciated that the mapping entry 306 shows an example entry from a collection of mapping entries including any number of mappings between VNIDs and GUIDs associated with virtual networks and storage volumes, respectively.

Based on the mapping entry 306, the storage volume management system 106 may enable host systems within the first virtual network 302a to have access to the storage volume 304 associated with GUID-0001. In particular, prior to receiving a request to move the storage volume 304, the storage volume management system 106 can provide instructions and/or mapping data to switches or other devices on the cloud computing system 102 to forward traffic from host systems on the first virtual network 302a to the storage volume 304. Conversely, traffic from the storage volume 304 may be forwarded to the first virtual network 302a.

As mentioned above, the storage volume management system 106 can receive a request 308 to move the storage volume between virtual networks. As an example, the storage volume management system 106 can receive a request 308 requesting that the storage volume 304 from the first virtual network 302a be moved to the second virtual network 302b (e.g., that a virtual instance of the storage system be moved between the virtual networks 302a-b). The request 308 may include an IP address or other identifier associated with the second virtual network 302b. The request 308 may further include an identification of the storage volume 304 (e.g., the GUID). In addition, the request may further include instructions associated with providing access (e.g., limited access, full access) to the storage volume 304.

In one or more embodiments, the request 308 includes a request to move the storage volume to the second virtual network 302b corresponding to an existing virtual network on the cloud computing system 102. As an example, where the virtual networks 302a-b correspond to departments of users or individuals within a larger organization (e.g., business, university, government agency), the request 308 to move the storage volume 304 may involve a request to apply a set of access policies to the storage volume 304 for users of the second virtual network 302b. The request 308 to move the storage volume 304 may further involve removing access or, alternatively, maintaining current access policies for users of the first virtual network 302a.

FIG. 3B illustrates example modifications to the environment 300 based on the request to move the storage volume and in accordance with one or more embodiments. For example, as a result of the request to move the storage volume 304 from the first virtual network 302a to the second virtual network 302b, the storage volume management system 106 may modify the mapping entry 306 based on the received request. In particular, where the request to move the storage volume 304 involves a request to remove the storage volume from the first virtual network 302a and move the storage volume 304 to the second virtual network 302b, the storage volume management system 106 may modify the mapping entry 306 to include a mapping between the second virtual network 302b and the storage volume 304 (e.g., rather than the mapping between the first virtual network 302a and the storage volume 304 shown in FIG. 3A).

Upon modifying the mapping entry 306 in this manner, the storage volume management system 106 can manage the flow of traffic between components of the environment 300 based on the changes to the mapping entry 306. For example, based on the updated mapping entry 306 shown in FIG. 3B, the storage volume management system 106 may enable host systems within the second virtual network 302b to have access to the storage volume 304 associated with GUID-0001. In particular, based on the request to move the storage volume 304 and in accordance with the changes to the mapping entry 306, the storage volume management system 106 can provide updated mapping data and instructions to switches (e.g., top of the rack switches) or other devices on the cloud computing system 102 to facilitate forwarding network traffic from host systems on the second virtual network 302b to the storage volume 304. Conversely, traffic from the storage volume 304 may be forward to the second virtual network 302b based on changes to the mapping entry 306.

It will be appreciated that FIG. 3B illustrates an example implementation in which access to the storage volume 304 is provided to host system(s) on the second virtual network 302b while also preventing access from host system(s) on the first virtual network 302a. In particular, by replacing a mapping between GUID-0001 and VNID-A associated with the first virtual network 302a with an updated mapping between GUID-0001 and VNID-B associated with the second virtual network 302b, the storage volume management system 106 can provide access to the second virtual network 302b while removing access to the storage volume 304 from the first virtual network 302a.

FIG. 3C illustrates an example implementation in which access is provided to both the first virtual network 302a and the second virtual network 302b based on a received request to move the storage volume 304. For example, the storage volume management system 106 can receive a request including instructions to provide access to host systems on the second virtual network 302b access to the storage volume 304 including an indication to not remove or otherwise modify access to the volume storage for host systems of the first virtual network 302a.

As shown in FIG. 3C, in response to the request, the storage volume management system 106 can modify the mapping entry 306 (or create an additional entry) to include a mapping between the first virtual network 302a and the storage volume 304 in addition to a mapping between the second virtual network 302b and the storage volume 304. More specifically, and as shown in FIG. 3C, the storage volume management system 106 can update the mapping entry 306 to keep a first mapping between VNID-A and GUID-0001. In addition, the storage volume management system 106 can update the mapping entry 306 to include a second mapping between VNID-B and GUID-0001. In this instance, the storage volume management system 106 may provide access to the storage volume 304 to host systems from both the first virtual network 302a and the second virtual network 302b.

In each of the above example, the storage volume management system 106 can perform a series of health checks prior to proceeding with redirecting network traffic in accordance with the updated mapping entry 306. For example, upon updating the mapping entry 306, the storage volume management system 106 can verify that a host system associated with VNID-B has access to the storage volume 304. For instance, the storage volume management system 106 can run a health check to ensure that upstream traffic originating from the storage volume 304 is forwarded to a host system on the second virtual network 302b and that the host system can read, decode, or otherwise access the data received via an information packet originating from the storage volume 304. Similarly, the storage volume management system 106 can run a health check to ensure that downstream traffic originating from the second virtual network 302b is correctly forwarded to and accessible via the storage volume 304.

In addition, while not explicitly shown in FIGS. 3A-3C, as mapping entries of the virtual storage map 108 are updated, one or more volume storages may become unassociated with a corresponding virtual network identifier. For example, as a result of a first IP address being replaced with another IP address in response to a request to move a storage volume, the GUID of the storage volume may no longer show up within any of the mappings of the virtual storage map 108.

In one or more embodiments, the storage volume management system 106 may perform one or more garbage collection processes based on whether volume storages are associated with one or more virtual identifiers within the virtual storage map 108. For instance, where a GUID for a storage volume is no longer associated with a virtual network identifier (e.g., for a predetermined period of time), the storage volume management system 106 may perform a garbage collection process on the storage volume to free up the storage volume for use by additional applications on the cloud computing system 102. By periodically performing garbage collection in this way, the storage volume management system 106 can re-use data storage volumes no longer being used by any existing virtual networks and enable the storage volumes to be available for any new virtual machines or virtual networks that are deployed on the cloud computing system 102.

Figure 4A:
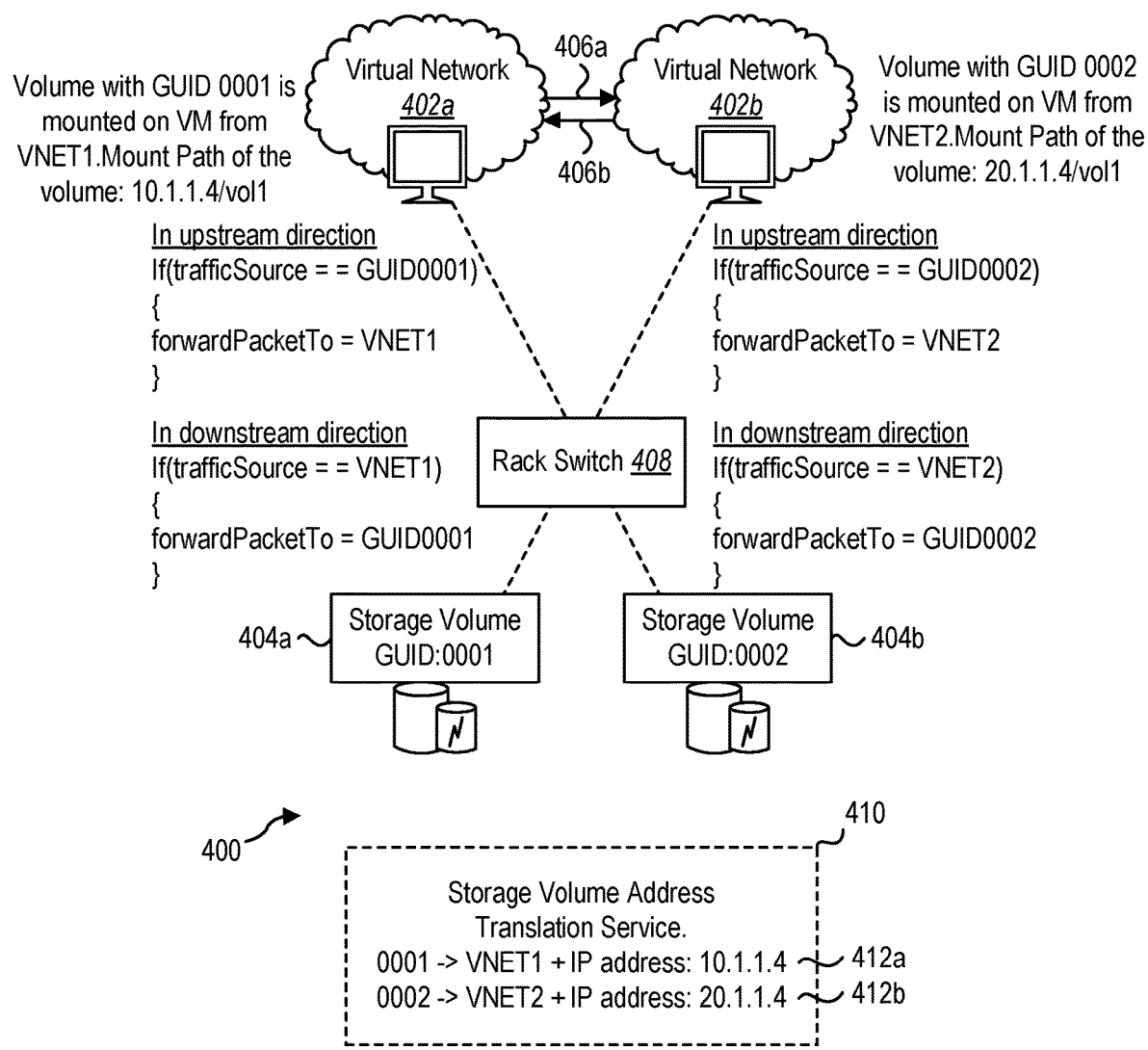
FIGS. 4A-4B illustrate another example implementation of facilitating movement of storage volumes between virtual networks in accordance with one or more implementations.
Figure 4B:
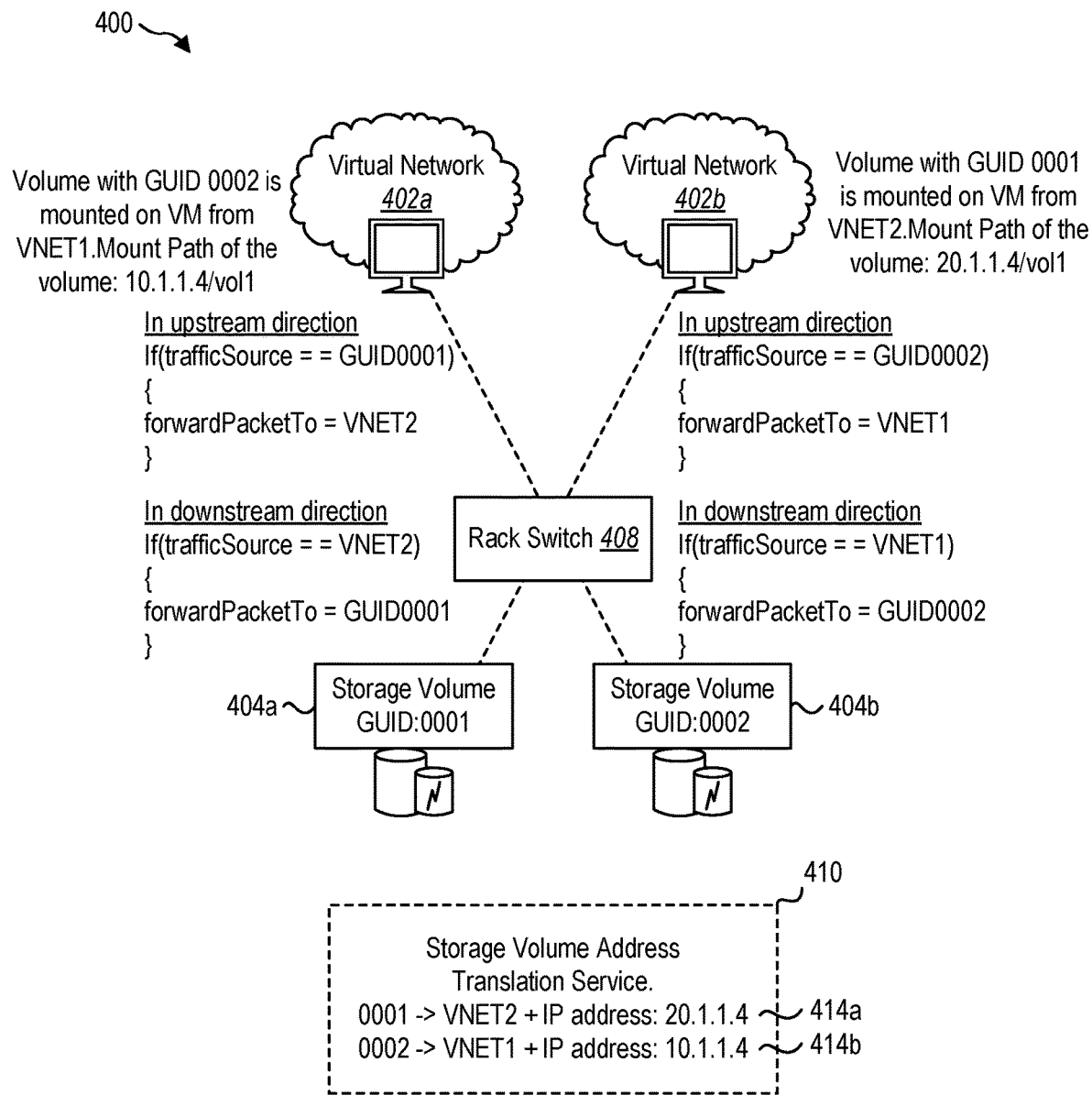

FIGS. 4A-4B illustrate another example implementation of a storage volume management system 106 moving storage volumes between virtual networks in accordance with one or more embodiments. In particular, FIGS. 4A-4B illustrate example states of an environment 400 including virtual networks 402a-b having access to storage volumes 404a-b prior to and after receiving a request to move storage volumes between the respective virtual networks 402a-b. In particular, FIG. 4A illustrates a state of the environment 400 prior to the storage volume management system 106 receives a request to move the storage volumes while FIG. 4B illustrates a state of the environment 400 after the storage volume management system 106 has caused the storage volumes 404a-b to be moved between the virtual networks 402a-b.

As shown in FIG. 4A, the environment 400 includes a first virtual network 402a. The first virtual network 402a may have access to a first storage volume 404a. By way of example, first storage volume 404a having a first GUID (GUID-0001) may be mounted on a virtual machine (VM) from the first virtual network 402a. As shown in FIG. 4A, an example mount path of the first storage volume 404a may be 10.1.1.4/vol. 1.

As further shown in FIG. 4B, the environment includes a second virtual network 404b. The second virtual network 402b may have access to a second storage volume 404b. By way of example, the second storage volume 404b having a second GUID (GUID-0002) may be mounted on a VM from the second virtual network 402b. As shown in FIG. 4A, an example mount path of the second storage volume 404b may be 20.1.1.4/vol. 1.

The environment 100 may further include a rack switch 408 (e.g., a top of the rack switch device) for routing traffic to and from components of the environment 100. The rack switch 408 may be at the top of the same rack as host systems on which the first storage volume 404a and the second storage volume 404b are located. Alternatively, the rack switch 408 may refer to any switch in communication with host systems on a data center (or across multiple data centers within a region of the cloud computing system 102) capable of routing traffic between devices of the data center(s).

As further shown, the storage volume management system 106 may maintain a storage volume address translation service 410 (or simply "translation service 410"). The translation service 410 may be an example implementation of the virtual storage map 108 described above in connection with FIGS. 1-2. As shown in FIG. 4A, the translation service 410 may include a plurality of mapping entries 412a-b in which identifiers of virtual networks (e.g., VNET1 and VNET2) are mapped to GUIDs (e.g., GUID:0001 and GUID:0002) of associated storage volumes.

In particular, the translation service 410 includes a first mapping entry 412a associating a first GUID (GUID-0001) corresponding to the first storage volume 404a with an identifier of the first virtual network 402a. More specifically, the first mapping entry 412a associates the first GUID with an IP address (10.1.1.4) for the first virtual network 402a. As further shown, the translation service 410 includes a second mapping entry 412b associating a second GUID (GUID-0002) corresponding to the second storage volume 404b with an identifier of the second virtual network 402b. More specifically, the second mapping entry 412b associated the second GUID with an IP address (20.1.1.4) for the second virtual network 404b. While FIG. 4A illustrates a specific example including IP addresses that identify virtual networks, alternative implementations may include subnets indicating ranges of IP addresses, a specific VNET identifier, or other domain identifier indicating a logical or virtual location on the cloud computing system 102.

In accordance with one or more implementations described herein, the storage volume management system 106 may use the mapping entries 412a-b of the translation service 410 to enable the rack switch 408 to route traffic to corresponding locations within the cloud computing system 102. For example, if the first storage volume 404a corresponding to GUID-0001 is a source of upstream network traffic (e.g. if (trafficSource==GUID-0001)), the storage volume management system 106 may cause the rack switch 408 to forward the network traffic to the first virtual network 402a (e.g., forwardPacketTo=VNET1) based on the first mapping entry 412a associating GUID-0001 with the IP address 10.1.1.4. Alternatively, if the first virtual network 402a is the source of downstream network traffic (e.g., if (trafficSource==VNET1), the storage volume management system 106 may cause the rack switch 408 to forward the network traffic to the first storage volume 404a (e.g., forwardPacketTo=GUID-0001) similarly based on the first mapping entry 412a.

Along similar lines, if the second storage volume 404b corresponding to GUID-0002 is a source of upstream network traffic (e.g., if (trafficSource==GUID-0002)), the storage volume management system 106 may cause the rack switch 408 to forward the network traffic to the second virtual network 402b (e.g., forwardPacketTo=VNET2) based on the second mapping entry 412b associating GUID-0002 with the IP address 20.1.1.4. Alternatively, if the second virtual network 402b is a source of downstream network traffic (e.g., if (trafficSource==VNET2)), the storage volume management system 106 may cause the rack switch 408 to forward the network traffic to the second storage volume 404b (e.g., forwardPacketTo=GUID-0002) similarly based on the second mapping entry 412b.

As illustrated in FIG. 4A, the storage volume management system 106 may receive requests 406a-b to move the storage volumes between virtual networks 402a-b. FIG. 4B illustrate an example implementation of the environment 400 including similar components discussed above in connection with FIG. 4A after receiving and processing a request to move the storage volumes between the respective virtual networks 402a-b. In particular, the storage volume management system 106 may receive a request 406a to move the first storage volume 404a from the first virtual network 402a to the second virtual network 402b. In conjunction with or independent from the request 406a to move the first storage volume 404a, the storage volume management system 106 may further receive a request 406b to move the second storage volume 404b from the second virtual network 402b to the first virtual network 402a. As an example, these requests 406a-b may be part of a process to reorganize departments or customer groups and/or modify permissions associated with various storage volumes to individuals within departments of a larger organization.

As shown in FIG. 4B, in response to the request to move the storage volumes, the storage volume management system 106 may update the translation service 410 to include modified mapping entries 414a-b. In particular, based on the request to move the first storage volume 404a to the second virtual network 402b, the storage volume management system 106 may create a first modified mapping entry 414a by replacing the first virtual network identifier (e.g., VNET1 and/or 10.1.1.4) with the second virtual network identifier (e.g., VNET2 and/or 20.1.1.4 IP address). As a result, GUID-0001 associated with the first storage volume 404a is now associated with the 20.1.1.4 IP address corresponding to the second virtual network 402b. In addition, based on the request to move the second storage volume 404b to the first virtual network 402a, the storage volume management system 106 may create a second modified mapping entry 414b by replacing the second virtual network identifier (e.g., VNET2 and/or 20.1.1.4) with the first virtual network identifier (e.g., VNET1 and/or 10.1.1.4). As a result, GUID-0002 associated with the second storage volume 404b is now associated with the 10.1.1.4 IP address corresponding to the first virtual network 402a.

After movement of the storage volumes 404a-b between the virtual networks 402a-b, the storage volume management system 106 may cause the rack switch 408 to route network traffic (e.g., information packets) as shown in FIG. 4B. For example, if the first storage volume 404a is a source of upstream network traffic (e.g., if (trafficSource GUID-0001)), the storage volume management system 106 may cause the rack switch 408 to forward the network traffic to the second virtual network 402b (e.g., forwardPacketTo=VNET2) based on the first updated mapping entry 414a associating GUID-0001 with the IP address 20.1.1.4. Alternatively, if the first virtual network 402a is the source of downstream network traffic (e.g., if (trafficSource==VNET1), the storage volume management system 106 may cause the rack switch 408 to forward the network traffic to the second storage volume 404b (e.g., forwardPacketTo=GUID-0002) similarly based on the first updated mapping entry 414a.

Along similar lines, if the second storage volume 404b corresponding to GUID-0002 is a source of upstream network traffic (e.g., if (trafficSource==GUID-0002)), the storage volume management system 106 may cause the rack switch 408 to forward the network traffic to the first virtual network 402a (e.g., forwardPacketTo=VNET1) based on the second updated mapping entry 414b associating GUID-0002 with the IP address 10.1.1.4. Alternatively, if the second virtual network 402b is a source of downstream network traffic (e.g., if (trafficSource==VNET2), the storage volume management system 106 may cause the rack switch 408 to forward the network traffic to the first storage volume 404*a* (e.g., forwardPacketTo=GUID-0001) similarly based on the second mapping entry 412*b*.

Figure 5:
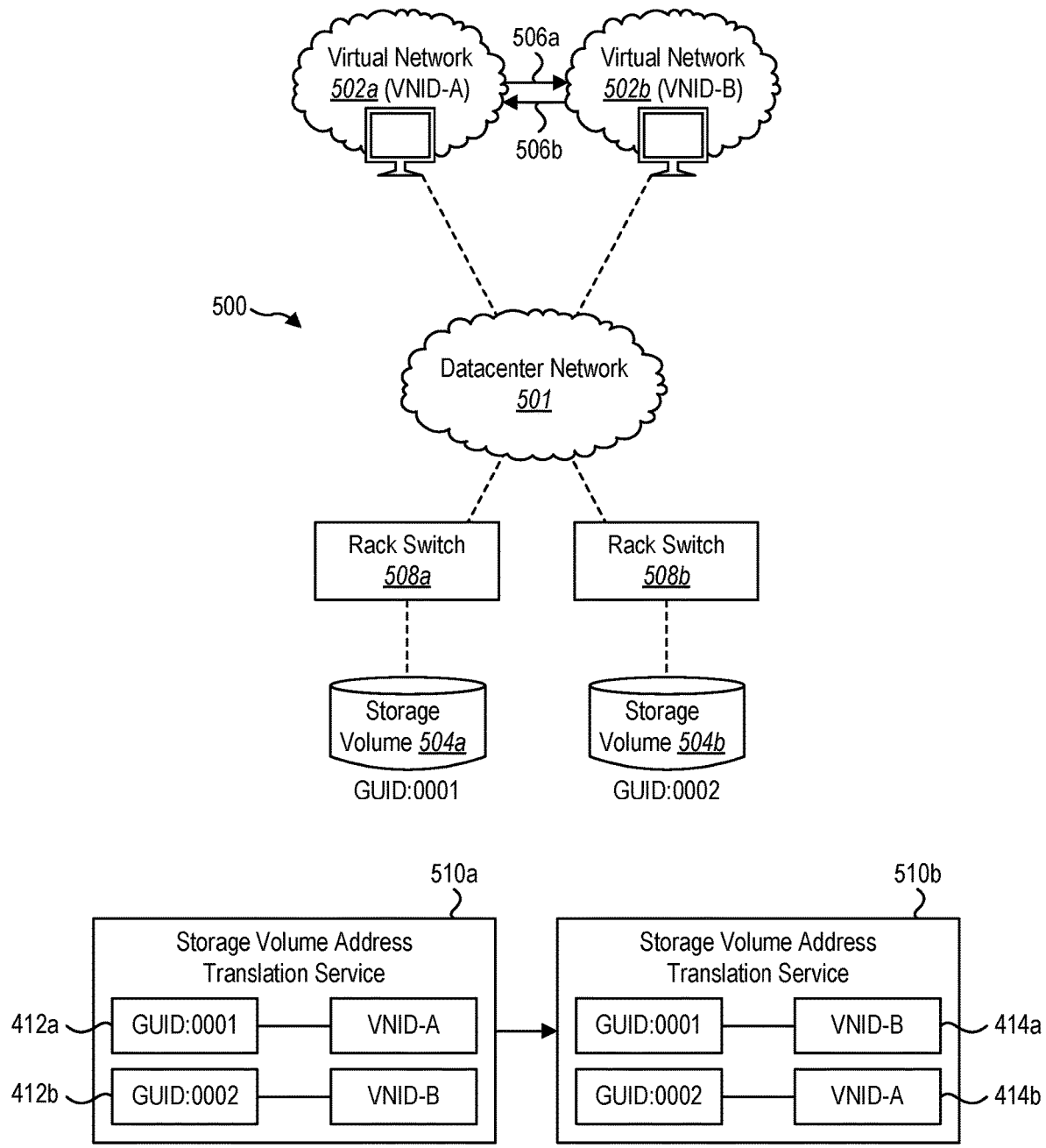
FIG. 5 illustrates another example implementation of facilitating movement of storage volumes between virtual networks in accordance with one or more implementations.

FIG. 5 illustrates another example implementation of a storage volume management system 106 moving storage volumes between virtual networks. In particular, FIG. 5 illustrates an example environment 500 including virtual networks 502*a-b*. Each of the virtual networks 502*a-b* may have corresponding virtual network identifiers (e.g., VNID-A and VNID-B). The virtual network identifiers may be similar or identical to those discussed above in connection with FIGS. 4A-4B.

As further shown, the environment 500 includes a datacenter network 501 including infrastructure that enables devices of a datacenter to communicate with one another. In addition to the virtual networks 502*a-b*, the environment 500 includes rack switches 508*a-b* (e.g., top of the rack switches) associated with corresponding storage volumes 504*a-b*. A first storage volumes 504*a* may have a first GUID (GUID-0001) while a second storage volume 504*b* has a second GUID (GUID-0002).

Similar to the example discussed in connection with FIGS. 4A-4B, the storage volume management system 106 may maintain a storage volume address translation service (or simply "translation service") having different associations before and after receiving a request to move storage volumes 504*a-b* between the virtual networks 502*a-b*. In particular, based on receiving a first request 506*a* to move the first storage volume 504*a* from the first virtual network 502*a* to the second virtual network 502*b* and a second request 506*b* to move the second storage volume 504*b* from the second virtual network 502*b* to the first virtual network 502*b*, the storage volume management system 106 may update mapping entries of the translation service in accordance with one or more implementations.

In particular, prior to receiving the requests 506*a-b*, the translation service 510*a* may include a first mapping entry 412*a* mapping GUID-0001 associated with the first storage volume 504*a* with VNID-A associated with the first virtual network 502*a*. As further shown, the translation service 510*a* may include a second mapping entry 412*b* mapping GUID-0002 associated with the second storage volume 504*b* with VNID-B associated with the second virtual network 502*b*. Accordingly, prior to receiving the requests 506*a-b*, upstream and downstream traffic may be routed between the first virtual network 502*a* and the first storage volume 504*a* via the datacenter network 501 and the first rack switch 508*a*. Similarly, upstream and downstream traffic may be routed between the second virtual network 502*b* and the second storage volume 504*b* via the datacenter network 501 and the second rack switch 508*b*. Indeed, this forwarding of network traffic may be performed using similar features and functionality as discussed above in connection with FIG. 4A.

As further shown, in response to the requests 506*a-b*, the storage volume management system 106 may update the translation service 510*b* to include a first updated mapping entry 514*a* mapping GUID-0001 associated with the first storage volume 504*a* with VNID-B associated with the second virtual network 502*b*. As further shown, the updated translation service 510*b* may include a second updated mapping entry 514*b* mapping GUID-0002 associated with the second storage volume 504*b* with VNID-A associated with the first virtual network 502*a*. As a result, after receiving the requests 506*a-b*, upstream and downstream traffic may be routed between the first virtual network 502*a* and the second storage volume 504*b* via the datacenter network 501 and the second rack switch 508*b*. Similarly, upstream and downstream traffic may be routed between the second virtual network 502*b* and the first storage volume 504*a* via the datacenter network 501 and the second rack switch 508*b*. Indeed, this forwarding of network traffic may be performed using similar features and functionality as discussed above in connection with FIG. 4B.

Figure 6A:
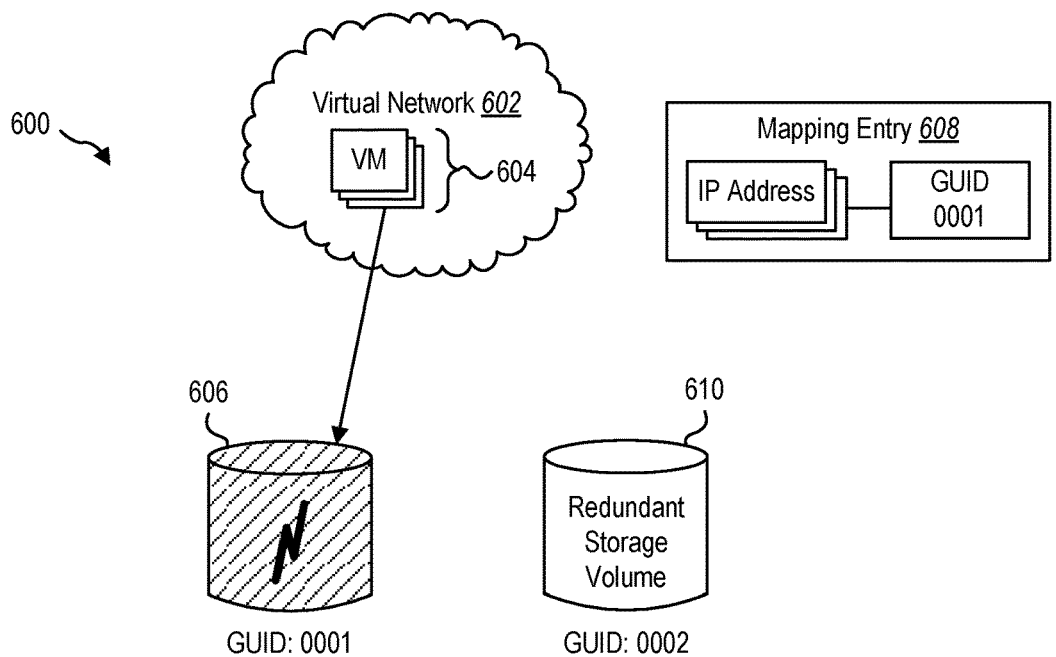
FIGS. 6A-6B illustrate an example implementation of modifying a storage volume map to enable virtual machines on a virtual network to access a redundant storage volume in accordance with one or more embodiments.

While one or more embodiments described herein relate specifically to modifying a virtual storage map 108 based on requests to move storage volumes from one virtual network to another virtual network, similar features and functionality may apply when directing virtual machines or other cloud-based services to access a redundant storage source (e.g., as a result of a storage volume going down or becoming inaccessible). For example, FIG. 6A illustrates an example environment 600 showing a virtual network 602 having a plurality of virtual machines (VMs) 604 implemented thereon. Each of the VMs 604 may be associated with a corresponding IP address. As further shown, a mapping entry 608 may include mappings between network identifiers (e.g., IP addresses of the VMs 604) and a storage volume identifier (GUID-0001) associated with a storage volume 606 currently accessible to each of the VMs 604.

Figure 6B:
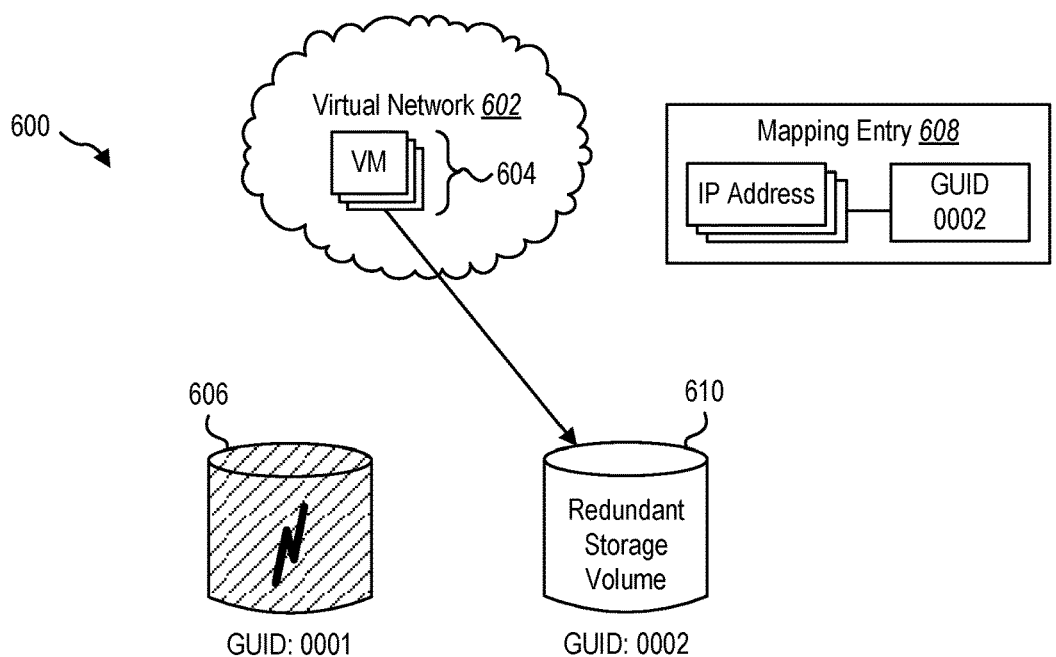

FIG. 6B illustrates an example implementation based on the storage volume 606 losing power, becoming disconnected, or otherwise going down. As a result, the VMs 604 can no longer access data maintained on the storage volume 606. Where a cloud computing system 102 has a redundant storage volume 610 including a recent or current version of the data stored on the storage volume 606, the storage volume management system 106 may quickly and conveniently redirect mapping information for the VMs 604 to point to the redundant storage volume 610.

For example, in response to detecting or otherwise identifying that the storage volume 606 has gone down, the storage volume management system 106 may modify the mapping entry 608 by replacing the GUID associated with the storage volume 606 with a GUID associated with the redundant storage volume 610. For instance, as shown in FIG. 6B, the storage volume management system 106 can replace GUID-0001 previously associated with each of the IP addresses of the VMs 604 with GUID-0002. The storage volume management system 106 may utilize the updated mapping to cause downstream network traffic originating from the VMs 604 to be forwarded to the redundant storage volume 610. Similarly, the storage volume management system 106 may utilize the updated mapping to cause upstream network traffic originating from the redundant storage volume 610 to be forwarded to corresponding VMs 604 on the virtual network 602.

Figure 7:
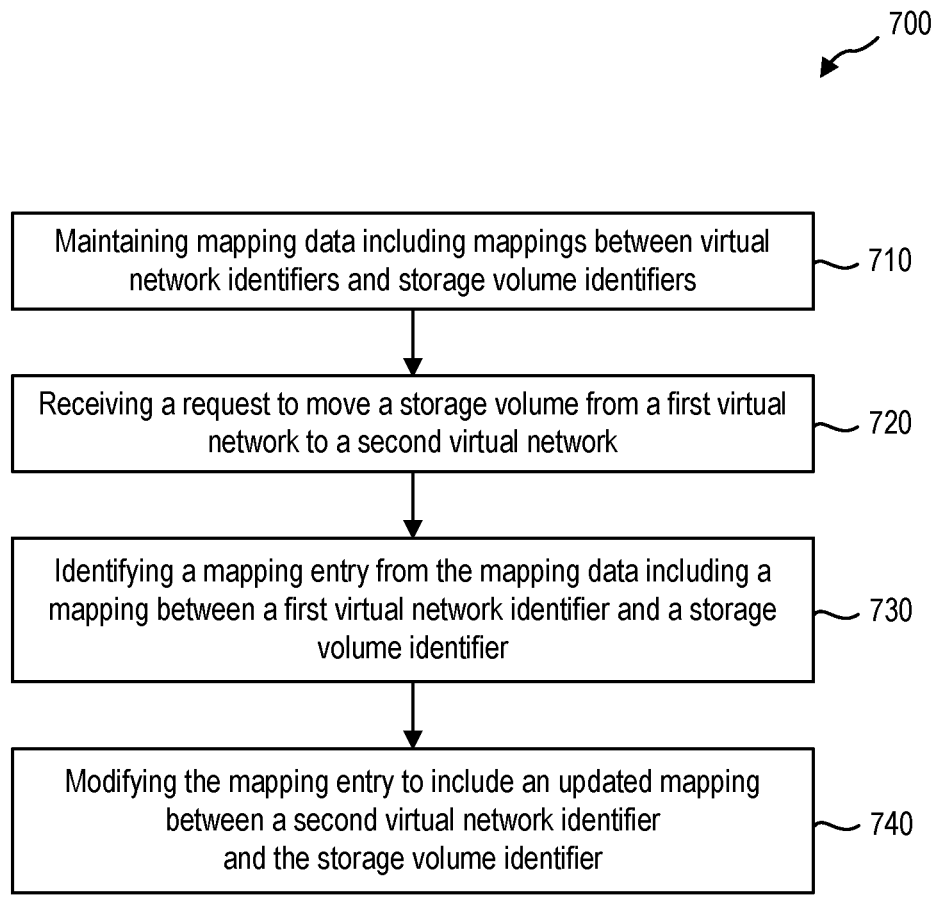
FIG. 7 illustrates an example series of acts for facilitating movement of a storage volume between virtual boundaries in accordance with one or more implementations.

Turning now to FIG. 7, this figure illustrates an example flowchart including a series of acts for moving storage volumes between virtual networks on a cloud computing system. While FIG. 7 illustrates acts according to one or more embodiments, alternative embodiments may omit, add to, reorder, and/or modify any of the acts shown in FIG. 7. The acts of FIG. 7 can be performed as part of a method. Alternatively, a non-transitory computer-readable medium can include instructions that, when executed by one or more processors, cause a computing device to perform the acts of FIG. 7. In still further embodiments, a system can perform the acts of FIG. 7.

For example, FIG. 7 illustrates a series of acts 700 for moving storage volumes between virtual networks. As shown in FIG. 7, the series of acts 700 includes an act 710 of maintaining mapping data including mappings between virtual network identifiers and storage volume identifiers. In one or more implementations, the act 710 involves maintaining mapping data including a plurality of mapping entries, the plurality of mapping entries comprising mappings between virtual network identifiers and storage volume identifiers that point to storage volumes on a cloud computing system. As further shown, the series of acts 700 includes an act 720 of receiving a request to move a storage volume from a first virtual network to a second virtual network.

In one or more implementations, maintaining the mapping data includes maintaining a plurality of mapping entries for a set of storage volumes located on computing nodes across a region of datacenters on the cloud computing system. In one or more embodiments, the mapping data is implemented on a control plane where the control plane causes network traffic to be forwarded between the second virtual network and the storage volume in response to the request to move the storage volume to the second virtual network.

As further shown, the series of acts 700 includes an act 730 of identifying a mapping entry from the mapping data including a mapping between a first virtual network identifier and a storage volume identifier. In one or more implementations, the act 730 involves identifying, from the mapping data, a mapping entry including a mapping between a first virtual network identifier associated with the first virtual network and a storage volume identifier associated with the storage volume.

As further shown, the series of acts 700 includes an act 740 of modifying the mapping entry to include an updated mapping between a second virtual network identifier and the storage volume identifier. In one or more implementations, the act 740 involves modifying the mapping entry to include an updated mapping between a second virtual network identifier corresponding to the second virtual network and the storage volume identifier.

In one or more implementations, the plurality of mapping entries includes mappings between internet protocol (IP) addresses and globally unique identifiers (GUIDs) corresponding to the storage volumes on host systems of the cloud computing system. Further, in one or more implementations, modifying the mapping entry includes replacing a first IP address associated with the first virtual network with a second IP address associated with the second virtual network.

In one or more implementations, receiving the request to move the storage volume includes receiving an identification of one or more internet protocol (IP) addresses corresponding to the second virtual network. Further, the series of acts 700 may include, based on receiving the identification of the one or more IP addresses, deploying (e.g., spinning up) the second virtual network on one or more host systems associated with the identified one or more IP addresses.

In one or more implementations, receiving the request to move the storage volume includes receiving a request to provide a second host system on the second virtual network access to the storage volume while discontinuing or otherwise limiting access to the storage volume for a first host system on the first virtual network. Further, modifying the mapping entry may include replacing the first virtual network identifier with the second virtual network identifier within the mapping entry.

In one or more implementations, receiving the request to move the storage volume includes receiving a request to provide a second host system on the second virtual network access to the storage volume while continuing to provide access to the storage volume to a first host system on the first virtual network. Further, modifying the mapping entry may include adding an additional mapping between the second virtual network identifier and the storage volume identifier in addition to a previously stored mapping between the first virtual network identifier and the storage volume identifier.

In one or more implementations, the second virtual network includes a new virtual network initiated on the cloud computing system and including one or more host systems associated with the second virtual network identifier. The series of acts 700 may further include providing the one or more host systems of the new virtual network access to the storage volume based on the mapping between the second virtual network identifier corresponding to the second virtual network and the storage volume identifier.

In one or more implementations, the series of acts 700 includes determining that at least one storage volume identifier associated with one or more storage volumes on the cloud computing system is not associated with any virtual network identifiers within the mapping data. The series of acts 700 may further include performing garbage collection on the one or more storage volumes based on determining that the at least one storage volume identifier is not associated with any virtual network identifiers within the mapping data. In one or more implementations, the series of acts 700 may include using the modified mapping entry to perform one or more health checks associated with verifying that network traffic is being forwarded correctly between a host system of the second virtual network and the storage volume.

Figure 8:
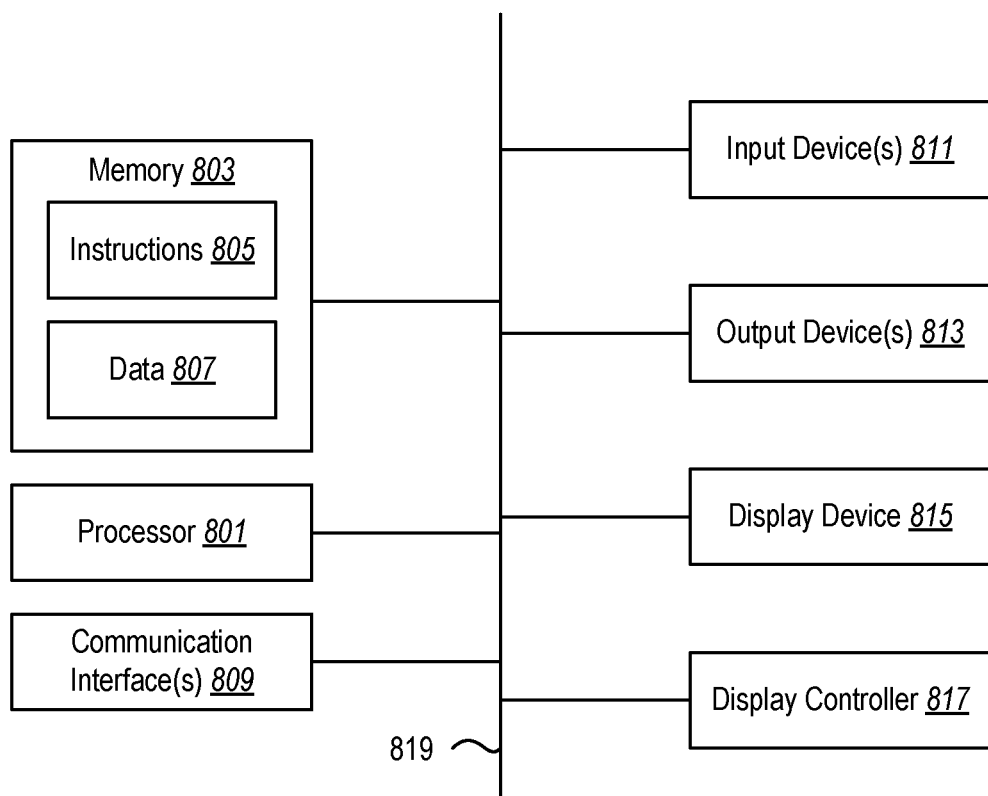
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    maintaining mapping data including a plurality of mapping entries, the plurality of mapping entries comprising mappings between virtual network identifiers and storage volume identifiers that point to storage volumes on a cloud computing system;
    receiving a request to move a storage volume from a first virtual network to a second virtual network;
    identifying, from the mapping data, a mapping entry including a mapping between a first virtual network identifier associated with the first virtual network and a storage volume identifier associated with the storage volume; and
    modifying the mapping entry to include an updated mapping between a second virtual network identifier corresponding to the second virtual network and the storage volume identifier.

2. The method of claim 1, wherein maintaining the mapping data comprises maintaining the plurality of mapping entries for a set of storage volumes located on computing nodes across a region of datacenters on the cloud computing system.

3. The method of claim 1, wherein the mapping data is implemented on a control plane, wherein the control plane causes network traffic to be forwarded between the second virtual network and the storage volume in response to the request to move the storage volume to the second virtual network.

4. The method of claim 1, wherein the plurality of mapping entries includes mappings between internet protocol (IP) addresses and globally unique identifiers (GUIDs) corresponding to the storage volumes on host systems of the cloud computing system.

5. The method of claim 4, wherein modifying the mapping entry comprises replacing a first IP address associated with the first virtual network with a second IP address associated with the second virtual network.

6. The method of claim 1, wherein receiving the request to move the storage volume comprises receiving an identification of one or more internet protocol (IP) addresses corresponding to the second virtual network.

7. The method of claim 6, further comprising, based on receiving the identification of the one or more IP addresses, deploying the second virtual network on one or more host systems associated with the identified one or more IP addresses.

8. The method of claim 1,
wherein receiving the request to move the storage volume comprises receiving a request to provide a second host system on the second virtual network access to the storage volume while discontinuing access to the storage volume for a first host system on the first virtual network, and
wherein modifying the mapping entry includes replacing the first virtual network identifier with the second virtual network identifier within the mapping entry.

9. The method of claim 1,
wherein receiving the request to move the storage volume comprises receiving a request to provide a second host system on the second virtual network access to the storage volume while continuing to provide access to the storage volume to a first host system on the first virtual network, and
wherein modifying the mapping entry includes adding an additional mapping between the second virtual network identifier and the storage volume identifier in addition to a previously stored mapping between the first virtual network identifier and the storage volume identifier.

10. The method of claim 9, wherein the second virtual network comprises a new virtual network initiated on the cloud computing system and including one or more host systems associated with the second virtual network identifier, the method further comprising providing the one or more host systems of the new virtual network access to the storage volume based on the mapping between the second virtual network identifier corresponding to the second virtual network and the storage volume identifier.

11. The method of claim 1, further comprising:
determining that at least one storage volume identifier associated with one or more storage volumes on the cloud computing system is not associated with any virtual network identifiers within the mapping data; and
performing garbage collection on the one or more storage volumes based on determining that the at least one storage volume identifier is not associated with any virtual network identifiers within the mapping data.

12. The method of claim 1, further comprising using the modified mapping entry to perform one or more health checks associated with verifying that network traffic is being forwarded correctly between a host system of the second virtual network and the storage volume.

13. A system, comprising:
one or more processors;
memory in electronic communication with the one or more processors; and
instructions stored in the memory, the instructions being executable by the one or more processors to:
maintain mapping data including a plurality of mapping entries, the plurality of mapping entries comprising mappings between virtual network identifiers and storage volume identifiers that point to storage volumes on a cloud computing system;
receive a request to move a storage volume from a first virtual network to a second virtual network;
identify, from the mapping data, a mapping entry including a mapping between a first virtual network identifier associated with the first virtual network and a storage volume identifier associated with the storage volume; and
modify the mapping entry to include an updated mapping between a second virtual network identifier corresponding to the second virtual network and the storage volume identifier.

14. The system of claim 13, wherein the mapping data is implemented on a control plane, wherein the control plane causes network traffic to be forwarded between the second virtual network and the storage volume in response to the request to move the storage volume to the second virtual network.

15. The system of claim 13,
wherein the plurality of mapping entries includes mappings between internet protocol (IP) addresses and globally unique identifiers (GUIDs) corresponding to the storage volumes on host systems of the cloud computing system, and
wherein modifying the mapping entry comprises replacing a first IP address associated with the first virtual network with a second IP address associated with the second virtual network.

16. The system of claim 13, wherein receiving the request to move the storage volume comprises receiving an identification of one or more internet protocol (IP) addresses corresponding to the second virtual network, and further comprising instructions being executable to, based on receiving the identification of the one or more IP addresses, deploy the second virtual network on one or more host systems associated with the identified one or more IP addresses.

17. A non-transitory computer readable medium storing instructions thereon that, when executed by one or more processors, causes a computing device to:
maintain mapping data including a plurality of mapping entries, the plurality of mapping entries comprising mappings between virtual network identifiers and storage volume identifiers that point to storage volumes on a cloud computing system;
receive a request to move a storage volume from a first virtual network to a second virtual network;
identify a mapping entry from the mapping data including a mapping between a first virtual network identifier associated with the first virtual network and a storage volume identifier associated with the storage volume; and
modify the mapping entry to include an updated mapping between a second virtual network identifier corresponding to the second virtual network and the storage volume identifier.

18. The non-transitory computer readable medium of claim 17, wherein the mapping data is implemented on a control plane, wherein the control plane causes network traffic to be forwarded between the second virtual network and the storage volume in response to the request to move the storage volume to the second virtual network.

19. The non-transitory computer readable medium of claim 17,
wherein the plurality of mapping entries includes mappings between internet protocol (IP) addresses and globally unique identifiers (GUIDs) corresponding to the storage volumes on host systems of the cloud computing system, and
wherein modifying the mapping entry comprises replacing a first IP address associated with the first virtual network with a second IP address associated with the second virtual network.

20. The non-transitory computer readable medium of claim 17, wherein receiving the request to move the storage volume comprises receiving an identification of one or more internet protocol (IP) addresses corresponding to the second virtual network, and further comprising instructions that, when executed by the one or more processors, causes a computing device to, based on receiving the identification of the one or more IP addresses, spin up the second virtual network on one or more host systems associated with the identified one or more IP addresses.

* * * * *